UNITED STATES PATENT OFFICE.

ALEXANDER SCHWARCMAN, OF BUFFALO, NEW YORK, ASSIGNOR TO SPENCER KELLOGG AND SONS, INC., OF BUFFALO, NEW YORK, A CORPORATION OF NEW YORK.

CATALYST AND PROCESS OF PREPARING SAME.

1,172,062.   Specification of Letters Patent.   Patented Feb. 15, 1916.

No Drawing.   Application filed April 22, 1914.   Serial No. 833,757.

*To all whom it may concern:*

Be it known that I, ALEXANDER SCHWARCMAN, a citizen of the United States, residing at Buffalo, in the county of Erie and State of New York, have invented certain new and useful Improvements in Catalysts and Processes of Preparing Same, of which the following is a specification.

This invention relates to catalysts and processes of preparing same; and it comprises a method of preparing a catalyst useful for hardening oils wherein a nickel salt is precipitated together with a difficultly reducible acid or oxid in the presence of a dissolved colloid organic body and the precipitate is washed, dried and rendered active; and it also comprises as a new composition of matter nickel or nickel oxid molecularly commingled or united with a co-precipitated oxid or acid of difficultly reducible nature, such co-precipitated materials being of more or less colloid nature; all as more fully hereinafter set forth and as claimed.

While the commercial hardening of oils with the aid of hydrogen with nickel as a catalyst has made extensive progress a difficulty, which has hitherto not been satisfactorily overcome, has been that of producing a fatty product free of nickel. In the case of edible products the presence of nickel is of course very objectionable. The nickel is ordinarily employed in the form of metal, or as a mixture of oxid and metal reduced by hydrogen with perhaps some suboxid. Usually nickel nitrate is heated to convert it into oxid and then this oxid is reduced by hydrogen at temperatures around 300° C. The reduction is never complete at temperatures which will give a highly active product (300° C. and lower) and the catalytic material as used therefore always contains oxygen; contains oxid or suboxids or both. Sometimes the nickel is on a carrier such as kieselguhr or other inert mineral material in order to extend the active area of catalyst and lessen the specific gravity. Nickel alone tends to mud down in the oil and it is difficult to keep it in distribution therethrough; while the active surface is not as great as can be attained with the same amount of nickel on a carrier. When used with a relatively light carrier such as kieselguhr this difficulty does not obtain to such an extent and great active surface can be attained. Occasionally in lieu of using nickel reduced by hydrogen, nickel oxid itself is employed and the treatment with hydrogen in the hydrogenating operation is at a higher temperature.

In oil, metallic nickel of the nature of that usually employed in catalytic operation tends to form a colloidal solution; more or less of the nickel tends to go into suspension in a form in which it cannot be filtered out. And the nickel oxid, and particularly with acid oils, tends to form nickel soap; which also cannot be filtered out. This "sliming," as it is called in the art, of the nickel and the formation of nickel soap are serious difficulties in hydrogenation. The use of an inert carrier, such as kieselguhr, does not obviate the trouble since nickel tends to slime away freely from the carrier and nickel oxid is easily washed out and removed by the oil. The usual carriers indeed tend to increase the difficulty since the nickel is in a state of very fine sub-division and is only mechanically held.

In the present invention, I have obviated the noted difficulties and obtained certain new advantages by providing a carrier through which the nickel is, so to speak, molecularly distributed and which has a certain degree of molecular or chemical affinity therefor, so that the nickel is held back against the solvent or quasi-solvent action of the oil. In order to secure these results, I co-precipitate the nickel in the presence of an acid or slightly acid, oxid of more or less colloid nature and perform this operation in the presence of a protective colloid such as may be obtained by dissolving wool, hide, leather, etc., in a caustic soda solution. This caustic soda solution may be employed as the precipitant. In the presence of the protective colloid the precipitate has a physical form making it much more suitable for the present purposes.

In practical embodiments of my invention, I precipitate nickel together with an oxid (or hydrate) having a certain amount of affinity for nickel and for nickel oxid and also possessed of high absorptive power and of more or less colloid nature. This oxid should naturally be one which cannot be readily reduced and should not be actively basic or acid in its nature. The best oxid I have found is alumina, though I have found that a catalyst free from the noted objections may be obtained by co-precipitating the nickel with an oxid (or hydrate) having a certain amount of affinity for nickel and for nickel oxid and also possessed of high adsorptive powers. With such an oxid used as a carrier the active nickel is not removed by the oil physically or chemically. This oxid should naturally be one which cannot be readily reduced; should be at least somewhat colloid and should not be actively basic or acid. The best oxid I have found is alumina, though chromium sesquioxid is also very good. Chromium sesquioxid is however somewhat heavier than alumina and does not give a catalyst of as light average specific gravity as does the use of alumina. Silica is another good carrier for my purposes. In practice I may use a solution containing a nickel salt and a salt of the other oxid and precipitate the two oxids (or hydrates) together as a basic precipitate by the use of a suitable alkali.

In order to increase the colloid nature and adsorptive properties of the co-precipitated carrier oxid, I perform the operation in a solution containing some dissolved colloid organic matter. Wool, hide, leather, etc., dissolved in caustic soda are useful materials. A caustic soda solution of wool can be used for co-precipitating the oxids as in precipitating a solution containing a nickel salt and an alumina salt. For most purposes, I find that about 1 part of nickel (calculated as metal) to 2 parts of carrier oxid is a useful proportion. I may also use another inorganic body, such as sulfate of barium, as what may be here termed, for the sake of a name, a diluent or filler. For example, I may produce a precipitate containing 1 part of alumina, 1 part of nickel and 1 part of sulfate of barium by the use of caustic soda solution carrying dissolved wool.

The precipitated oxids (hydrates or carbonates) may be washed, dried and reduced at a low temperature in any of the ordinary ways. The reduced material when used for hydrogenating oil exhibits no tendency whatever to lose nickel by sliming, and little tendency, even with acid oils, to contaminate the oil with nickel soaps.

In a specific embodiment of my invention, I may take a solution containing, say, sulfate of alumina and sulfate of nickel and precipitate it by a solution of sodium hydrate (caustic soda) or carbonate containing about one to four per cent. of wool dissolved therein. Ammonia or potash may be used as a precipitate in lieu of soda. It is best to add the whole amount of precipitating alkali at once or in large portions to insure a co-precipitation of the two oxids. If the alkali is added slowly, with stirring, between additions, the nickel is not well distributed through the alumina. The alumina solution may be advantageously brought to the point of incipient precipitation by cautious additions of alkali prior to adding the nickel salt. The amount of alkali used in precipitation should be nearly that corresponding to the amount of salts present; i. e., not much more than is sufficient to make the solution distinctly alkaline after precipitation. Otherwise, in the case sodium hydrate, alumina may go into solution again. If ammonia in excess is used, nickel redissolves. Precipitating in the manner described, the nickel very likely goes down as an aluminate of nickel; i. e., as a material in which the two oxids are chemically combined and therefore molecularly intermingled and the material is of colloid nature because of the presence of a protective colloid (the wool). I may use nitrates or other soluble salts of the two metals instead of the sulfates mentioned. Ordinarily, I prefer not to use chlorids because they are somewhat more expensive and because the presence of any chlorin in the catalyst lessens its efficiency.

In a specific embodiment of my process I may dissolve 342 parts of sulfate of alumina and 155 parts of sulfate of nickel, (both calculated as the dry commercial material) in water. To this solution I may add a solution of 320 parts of caustic soda carrying in solution 5 to 15 parts of wool, hide, hair, glue, or other nitrogenous organic colloid material to precipitate the alumina and nickel oxid. The operation may be at the ordinary temperature but a boiling heat is often more convenient. The precipitate is next washed, advantageously with hot water, to get rid of sodium sulfate. The co-precipitated colloidal hydrated oxids are next heated. Where the oxids are to be used as such in oxid processes of hydrogenating, this heating may not go so far as to drive off all the water of hydration. Otherwise heating may be carried further, giving a molecular mixture (or chemical compound) of 102 parts of alumina and 75 parts of nickel oxid. This is then reduced with hydrogen at about 300° C. Presuming reduction to be complete, this would result in about 59 parts of metallic nickel and 102 parts of alumina or a proportion of, roughly, 1 : 2.

In lieu of an alumina salt I may use a salt of chromium sesquioxid in corresponding amount. The use of salts of iron, zinc, cobalt, etc. to furnish a carrier is much less advantageous since these metals are readily reduced and the final product is a mixture of reduced metals instead of reduced nickel on an unreduced carrier. Silica is a good carrier for my purpose; and a good material may be made by precipitating a solution of nickel sulfate or other nickel salt with a solution of waterglass (alkalin silicate, such as silicate of soda) carrying a dissolved protective colloid. Or a waterglass solution may be used in lieu of soda in precipitating a solution of sulfate of alumina and sulfate of nickel.

In making a catalyst with a filler, I may first precipitate sulfate of alumina and a soluble nickel salt in the manner described above, using caustic soda as a precipitant. This gives me a precipitate containing aluminate of nickel. Without removing the precipitate from the solution I may then add nitrate of barium (or chlorid) and precipitate sulfate of barium. This comes down as an excessively fine powder which acts as a diluent for the catalyst and gives the alumina holding the nickel a larger surface. Operating as stated, the sulfate of barium is, more or less, merely in a state of mechanical admixture with the catalyst. A more desirable method of operating which also obviates much of the labor of washing in the previously stated method is to perform the precipitation as above indicated, removing the bulk of the solution, and without washing the precipitate or washing only to a limited extent, to add thereto an amount of chlorid or nitrate of barium corresponding to the amount of sulfates still retained in the precipitate. The alumina having high adsorptive power it is difficult to remove all the sodium sulfate by washing while in this method of operation the absorbed sulfate is simply converted in place into insoluble sulfate of barium, while dissolved sodium chlorid or nitrate remains in its lieu. Either is readily removed by washing.

Any of the compositions described above after washing and freeing of soluble salts may be directly used for hydrogenating oils in the high temperature process where oxid of nickel is ordinarily employed. But it is better to dry and then reduce the precipitate by a current of hydrogen in the usual way. Reduction may be performed at any temperature from 250–350 degrees C; but temperatures around 300 give the best results. The reduced material obtained between 250–270 C. contains too much oxygen to be used in low temperature hydrogenation. Materials made at temperatures much above 300° are not as active as those made at temperatures around 300. The wool or other protective colloid may of course be employed where a filler is used. While the proportions may vary, as stated, I find it generally best to use a ratio of nickel to the carrier material of 1:2.

The precipitate may of course be formed in a solution containing a difficultly reducible fixed acid, like boric acid or phosphoric acid, capable of forming an insoluble compound with the oxids. Aluminum phosphate, etc. retain nickel in the same way as aluminum hydrate.

The influence of the dissolved wool or other organic colloids seem to be in giving the alumina etc. a particularly favorable physical form. Where the catalyst is reduced hot after its formation, the organic colloid of course disappears, but the physical form given the precipitate remains.

What I claim is:—

1. The process of making a catalytic preparation which comprises producing a composite precipitate of basic nature in a solution containing a salt of a catalytic metal and a salt of a difficultly reducible oxid by means of an alkaline solution containing a dissolved colloid, washing and drying.

2. The process of making a catalytic preparation which comprises producing a composite precipitate of basic nature in a solution containing a salt of nickel and a salt of a difficultly reducible oxid by means of an alkaline solution containing a dissolved colloid, washing, drying and reducing by hydrogen.

3. As a new composition of matter, a catalyst containing nickel and alumina co-precipitated in the presence of a protective organic colloid.

In testimony whereof, I affix my signature in the presence of two subscribing witnesses.

ALEXANDER SCHWARCMAN.

Witnesses:
E. H. STICKEL,
G. H. OERTEL.